3,212,332
THERMOMETER-ALTITUDE UNIT AND METHOD
Mike J. Pappas, P.O. Box 991, Raton, N. Mex.
Filed Mar. 18, 1963, Ser. No. 265,809
3 Claims. (Cl. 73—362.4)

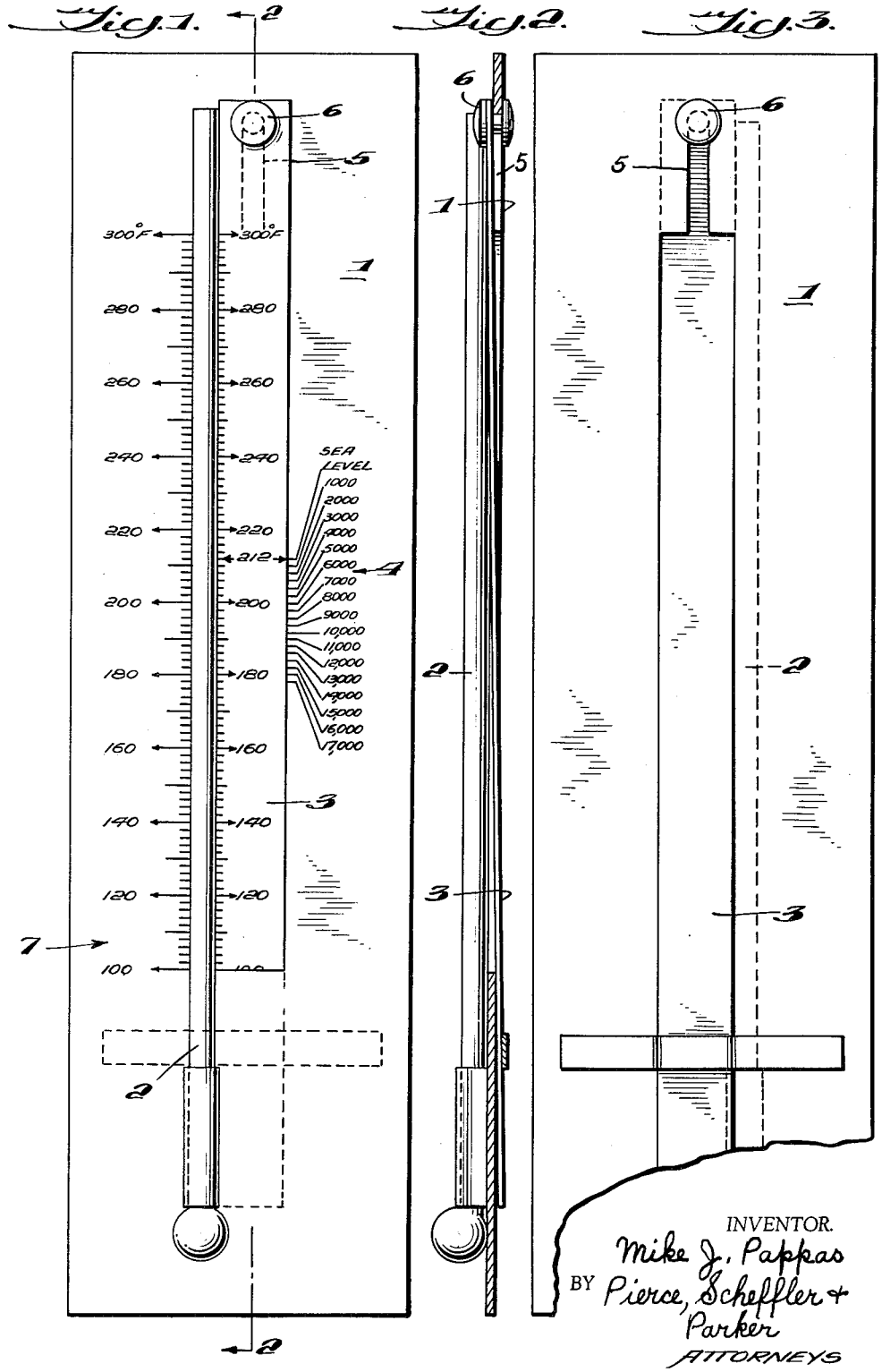

This invention relates to a thermometer-altitude device that will enable one, knowing the correct cooking temperature of an aqueous liquid or mixture, e.g. sugar solution at sea level and knowing the altitude above or below sea level at which the cooking is to be performed to determine the correct cooking temperature at said altitude.

The main object of this invention is to enable the user of this thermometer-altitude unit to make a ready computation of changes in temperature at which the liquid boils at different elevations above sea level.

Another object of this invention is to provide a method of determining the temperature at which a liquid boils at different elevations above sea level.

For the purpose of illustration it is contemplated that the liquid to be boiled is water or an aqueous liquid but it is obvious that this unit has more generic possibilities.

This thermometer-altitude unit is designed primarily for home or commercial use in making candy, jellies, syrup, frostings, etc., but can be used for other home, commercial, scientific, laboratory, or experimental purposes, as will appear.

The accompanying drawings illustrate the preferred embodiment of my invention.

In the drawings:

FIG. 1 is a front elevational view of the thermometer-altitude device,

FIG. 2 is a section on the line 2—2 of FIG. 1, and

FIG. 3 is a rear elevational view of the device.

Referring to the drawings the device or unit illustrated consists of the body 1, thermometer 2, adjustable scale 3, fixed altitude scale 4, slot 5, screw 6 and thermometer scale 7.

The drawings illustrate the simplest and most practical embodiment known to me of means for practicing the invention. Slidable scale 3 is adjusted longitudinally of the body 1 by means of slot 5 in body 1, in cooperation with a binder-type adjustment screw 6. When scale 3 has been adjusted to a position corresponding to the altitude at which cooking is to be carried out, this screw 6 is tightened to prevent accidental displacement of scale 3. It is obvious that other conventional means, e.g., gearing, readily might be substituted for the slot 5 and screw 6, as a means for making relative adjustments between the scale 3 and the body 1.

The suggested altitude scale 4 is arbitrary and merely illustrative; it has a sufficient range of altitude markings to cover any anticipated elevation at which this thermometer-altitude unit might be used, either for cooking at a known or an approximate elevation, or in a laboratory, etc. Since the anticipated principal use for this invention would be in comparatively local communities, where elevations are known it would appear to be unnecessary and impractical physically to embody a conventional altimeter in the thermometer-altitude unit but this could be done.

I have found that most candy, etc., recipes are given with the formula based on usage at sea level. Therefore, anyone 500 feet or more above sea level must allow for a decrease in the boiling point of the aqueous liquid. The rule is that the boiling point of water decreases by 1° F. for every 500 feet increase in altitude and this rule is approximately true for the aqueous liquids such as sugar solutions encountered in cooking and candy making.

The boiling point of water at sea level is 212° F. Thus at 500 feet altitude, the boiling point of water is 211° F.; at 1000 feet, 210° F.; at 1500 feet, 209° F., etc.

The principle of this invention is that since the boiling point of water and other aqueous liquids drops about 1° F. for every 500 ft. increase in altitude, the degree markings on all scales are equally spaced, or, that the measurable space between each degree marking is set to the same scale—so many per inch, etc. If ⅛″=1°, it is so on all three scales. The "fixed" point for the arrows or guide is 212° on scale 3.

The embodiment illustrated is not necessarily the proper size for all situations, as size can vary, but it shows fully the principle involved.

The altitude scale is per 1000 feet, but small markings are suggested for 500 feet intervals.

The Fahrenheit graduations are 2° graduations, which will be as accurate as desired for home and even commercial uses. Other uses possibly would require finer graduations.

I have used a binder type screw on slidable scale 3, and think something of this type would be the most economical. It is also simple to operate. The user simply would loosen this screw from the back, slide scale 3 to its proper position and retighten the screw. Since scale 3 is next to the capillary tube thermometer 2, it is best to work this screw from behind the backplate to avoid jarring the thermometer and for ease in operation. If conventional rail type runners should be fabricated on the backplate, scale 3 would then merely slip into place and be held securely by means of the binder screw.

To facilitate reading the unit could provide the thermometer tube in red, the slidable scale 3 in blue and the backplate 1 in white.

Correct cooking temperatures are as important as use of proper proportions of ingredients in making of candies, jellies, frostings, etc. The results produced by cooking to various temperatures will determine the outcome of the type, quality, and success of such operation. For example, cooking sugar solutions (with other proper ingredients) to 222° F., at sea level, produces a jelly; 238° F., a "soft ball"; 248° F., a "hard ball," etc. This example is in candy cooking. Again, I suggest other possible uses for this temperature-altitude unit in research, laboratory, etc.

If a person is at an altitude of 6500 feet a 13° decrease must be made to obtain the correct cooking temperature. Thus, a soft ball at sea level is 238° F.; at 6500 feet it is 238° less 13° or 225°.

The object of this invention is to provide a simple, inexpensive thermometer-altitude unit for measuring the correct cooking temperatures at a given altitude (to nearest 500 feet) above sea level. The invention generally contemplates the use of three scales (two stationary and one movable), associated with a regular type mercury charged capillary tube thermometer.

It is contemplated that the thermometer-altitude device could be built from various materials, preferably stainless steel, that it shall have a mercury charged capillary tube, and that the size, scale gradients and construction may vary.

The thermometer-altitude unit is used in the following manner: slidable scale 3 is adjusted or set so the right-hand pointer thereon will point to the desired altitude on scale 4. This arrow-pointer is marked at 212° F. on the slidable scale 3.

The arrow-pointer on the left hand side of the slidable scale 3 then will point to the capillary tube thermometer 2 and its scale 7, which will indicate the true temperature reading. If scale 3 is set at 6500 feet, the left arrow-pointer will point to 199° F., which is the correct boiling point of water at this elevation. When the scale 3 is set, then all the user has to do is follow the cooking recipe or formula (written at sea level) to the letter. If the recipe calls for cooking at 245° F., the user does so, on scale 3. As soon as the mercury in the capillary tube thermometer reaches 245° F. on scale 3, the proper temperature has been obtained. If the user then, for information purposes, looks at scale 7, he will see that the true temperature is 232° F. The 232° F. on scale 7 is the true and correct temperature, but by reading scale 3 no computation is necessary for the user, as scale 3 will show the degrees Fahrenheit as prescribed by the recipe or formula. The user must know the approximate altitude (within 500 ft.) where he is working.

I claim:

1. A thermometer-altitude unit for determining the temperature at which a liquid boils at different elevations above sea level, said unit comprising a mounting and supporting background surface formed of any suitable, rigid sheet material; a thermometer bulb and tube rigidly supported on and lengthwise of this supporting surface; a fixed temperature scale calibrated on the front surface of the sheet supporting surface alongside the principle length of the thermometer tube; a cooperating scale slidably supported with respect to said sheet supporting surface in functionally cooperative relationship with both the thermometer tube and the fixed temperature scale; a functionally related altitude scale calibrated on the sheet supporting surface in cooperative relation to said slidable scale, and a double-ended pointer fixed on the slidable scale in position to cooperate with both the thermometer scale and the altitude scale.

2. A thermometer-altitude unit as defined in claim 1, wherein means are provided for sliding the slidable scale and for securing it in an adjusted position.

3. A thermometer-altitude unit as defined in claim 1, wherein to facilitate reading, the sheet supporting surface, the thermometer bulb liquid, the slidable scale, the altitude scale and the double-ended pointer are executed in contrasting colors.

References Cited by the Examiner

UNITED STATES PATENTS

| | | | |
|---|---|---|---|
| 525,915 | 9/94 | Maurer | 73—374 |
| 1,630,291 | 5/27 | Carson | 73—362.4 |
| 2,681,572 | 6/54 | Lamb | 73—374 |

LOUIS R. PRINCE, *Primary Examiner.*

ISAAC LISANN, *Examiner.*